(12) United States Patent
Bae et al.

(10) Patent No.: US 10,198,057 B2
(45) Date of Patent: Feb. 5, 2019

(54) ELECTRONIC DEVICE AND METHOD FOR MEASURING POSITION CHANGE

(71) Applicant: Samsung Electronics Co., Ltd., Suwon-si, Gyeonggi-do (KR)

(72) Inventors: Dong-Hwan Bae, Suwon-si (KR); Jeong-Min Park, Suwon-si (KR); Sung-Ho Son, Daegu (KR); Woo-Young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 832 days.

(21) Appl. No.: 14/265,824

(22) Filed: Apr. 30, 2014

(65) Prior Publication Data

US 2015/0066424 A1 Mar. 5, 2015

(30) Foreign Application Priority Data

Aug. 29, 2013 (KR) ........................ 10-2013-0103371

(51) Int. Cl.
*G06F 1/32* (2006.01)

(52) U.S. Cl.
CPC .......... *G06F 1/3206* (2013.01); *G06F 1/3293* (2013.01); *Y02D 10/122* (2018.01)

(58) Field of Classification Search
CPC ........ G06F 1/3206; G06F 1/3293; G06F 1/32; G06F 3/011; Y02B 60/121
See application file for complete search history.

(56) References Cited

U.S. PATENT DOCUMENTS

| | | | |
|---|---|---|---|
| 5,491,486 A | 2/1996 | Welles, II et al. | |
| 2007/0146129 A1 | 6/2007 | Sun | |
| 2009/0249002 A1* | 10/2009 | Imahara | G05B 15/02 711/161 |
| 2010/0324819 A1* | 12/2010 | Nurminen | G01C 21/20 701/469 |
| 2011/0141275 A1* | 6/2011 | Toda | G01C 21/165 348/142 |

FOREIGN PATENT DOCUMENTS

KR 20100051917 A 5/2010

* cited by examiner

*Primary Examiner* — Mohamed Charioui
*Assistant Examiner* — Jeremy Delozier
(74) *Attorney, Agent, or Firm* — Jefferson IP Law, LLP

(57) ABSTRACT

An operating method of an electronic device is provided. The method includes determining, by a first processor using at least one sensor, whether a state change occurs, if it is determined that there is the state change, determining, by the first processor, whether to transmit state information to a second processor, and determining, by the second processor, whether to measure a changed position at each of set periods using a position measuring module on the basis of whether the state information is received.

14 Claims, 8 Drawing Sheets

ELECTRONIC DEVICE AND METHOD FOR MEASURING POSITION CHANGE

CROSS-REFERENCE TO RELATED APPLICATION(S)

This application claims the benefit under 35 U.S.C. § 119(a) of a Korean patent application filed on Aug. 29, 2013 in the Korean Intellectual Property Office and assigned Serial number 10-2013-0103371, the entire disclosure of which is hereby incorporated by reference.

TECHNICAL FIELD

The present disclosure relates to an electronic device and method for measuring a change in position. More particularly, the present disclosure relates to more effectively reducing current consumption in an electronic device by measuring a change in position of the electronic device using a second processor only when a first processor detects a state change.

BACKGROUND

Electronic devices commonly employ a method of detecting a change in movement by using a position measuring module. For example, after detecting a movement of the electronic device using an acceleration sensor, the electronic device may determine its position using a Global Positioning System (GPS) module.

Accordingly, in order to detect a change in movement of the electronic device, an Application Processor (AP) therein needs to operate continuously.

Therefore, a need exists for an apparatus and method which allows an electronic device to more efficiently operate continuously and measure changes in its position.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and method for effectively reducing current consumption of an electronic device by measuring a change in position of the electronic device by using a second processor only when a first processor connected to a plurality of sensors detects a state change of the electronic device.

Another aspect of the present disclosure is to provide a device and method for improving user convenience as a first processor detects a state change of an electronic device so as to prevent unnecessary repetition of a position measuring operation by a second processor.

In accordance with an aspect of the present disclosure, an operating method of an electronic device is provided. The method includes determining, by a first processor using at least one sensor, whether a state change occurs, if it is determined that there is the state change, determining, by the first processor, whether to transmit state information to a second processor, and determining, by the second processor, whether to measure a changed position at each of set periods by using a position measuring module on the basis of whether the state information is received.

The determining, by the first processor using at least one sensor, of whether the state change occurs may include determining, by the first processor, whether there is at least one change among a position change, an altitude change, a temperature change, a pressure change, a humidity change, an illumination change, and a pressure change, which exceed a determined numerical value, the at least one sensor being connected to the first processor.

If it is determined that there is the state change, the determining, by the first processor, of whether to transmit the state information to the second processor may include detecting, by the first processor, that the state change switches from a state of more than a determined numerical value into a state of less than a determined numerical value by using the at least one sensor connected to the first processor, and storing, by the first processor, information on a state switching into the state of less than the determined numerical value.

If it is determined that there is the state change, the determining, by the first processor, of whether to transmit the state information to the second processor may include detecting, by the first processor, that the state change switches from a state of less than a determined numerical value into a state of more than a determined numerical value by using the at least one sensor connected to the first processor, and determining, by the first processor, to transmit the state information to the second processor.

The determining, by the second processor, of whether to measure the changed position at each of the set periods by using a position measuring module on the basis of whether the state information is received may include, if the state information is not received, not measuring a position by the second processor even when a next position measuring period for starting to measure a position by using the position measuring module arrives.

The determining, by the second processor, of whether to measure the changed position at each of the set periods by using the position measuring module on the basis of whether the state information is received may include if the state information is received, confirming, by the second processor, a next position measuring period for starting to measure a position by using the position measuring module, confirming, by the second processor, that the next position measuring period for starting to measure a position by using the position measuring module arrives, and measuring, by the second processor, a changed position at the next position measuring period by using a position measuring module.

The confirming, by the second processor, that the next position measuring period for starting to measure the position by using the position measuring module arrives may include: reading, by the second processor, the state information from the first processor when the next position measuring period arrives, and confirming the read state information.

The method may further include, if it is determined to measure the changed position, measuring the changed position at a next position measuring period for starting to measure a position by using the position measuring module among the set periods.

The first processor may operate with a low power of less than a set power.

The second processor may be in at least one of a wake-up state and a sleep state.

In accordance with another aspect of the present disclosure, an electronic device is provided. The electronic device includes a first processor configured to determine, using at least one sensor, whether a state change occurs, and if it is determined that there is the state change, configured to determine whether to transmit state information to a second processor, and the second processor determining whether to measure a changed position at each of set periods by using a position measuring module on the basis of whether the state information is received.

The first processor using at least one sensor is further configured to determine whether there is at least one change among a position change, an altitude change, a temperature change, a pressure change, a humidity change, an illumination change, and a pressure change, which exceed a determined numerical value, the at least one sensor being connected to the first processor.

The first processor may be configured to detect that the state change switches from a state of more than a determined numerical value into a state of less than a determined numerical value by using the at least one sensor connected to the first processor, and the device may further include a memory configured to store information on a state switching into the state of less than the determined numerical value.

The first processor may be configured to detect that the state change switches from a state of less than a determined numerical value into a state of more than a determined numerical value by using the at least one sensor connected to the first processor and configured to determine to transmit the state information to the second processor.

If the state information is not received, the second processor may be configured not to measure a position even when a next position measuring period for starting to measure a position by using the position measuring module arrives.

The second processor may be configured to confirm a next position measuring period for starting to measure a position by using the position measuring module if the state information is received, to confirm that the next position measuring period for starting to measure a position by using the position measuring module arrives, and to measure a changed position at the next position measuring period by using a position measuring module.

The second processor may be configured to read the state information from the first processor when the next position measuring period arrives and confirm the read state information.

If it is determined to measure the changed position, the second processor may be configured to measure the changed position at a next position measuring period for starting to measure a position by using the position measuring module among the set periods.

The first processor may be configured to operate with a low power of less than a set power.

The second processor may be configured to operate in at least one of a wake-up state and a sleep state.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
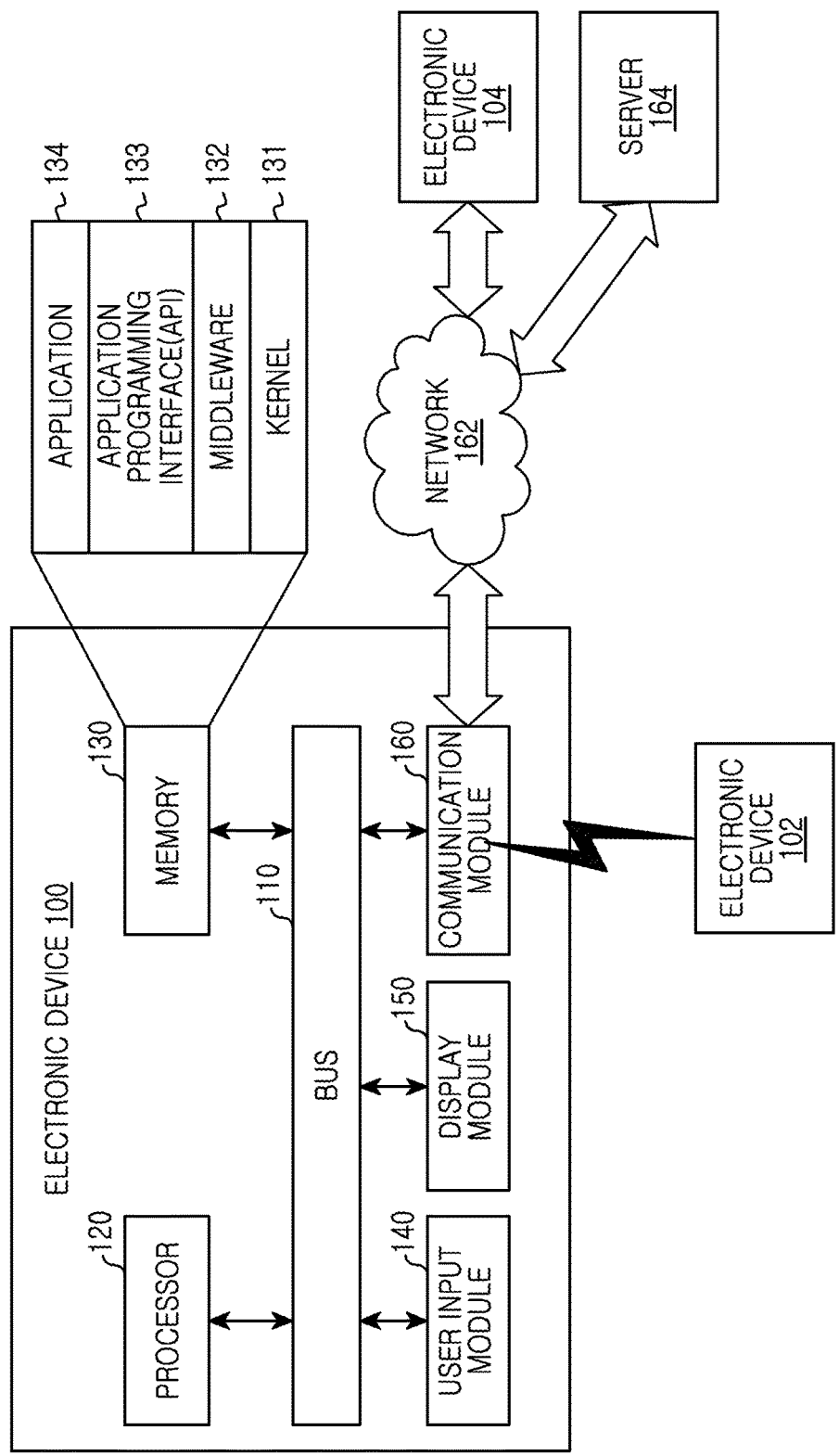
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalent.

It is to be understood that the singular forms "a," "an," and "the" include plural referents unless the context clearly dictates otherwise. Thus, for example, reference to "a component surface" includes reference to one or more of such surfaces.

An electronic device according to an embodiment of the present disclosure may be a device having a communication function. For example, the electronic device may be a combination including at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic necklace, an electronic accessory, a camera, a wearable device, an electronic clock, a wrist watch, a smart appliance (for example, a refrigerator, an air conditioner, a vacuum cleaner, an artificial intelligence robot, a TV, a Digital Video Disk (DVD) player, an audio system, an oven, a microwave, a washing machine, an air purifier, and a digital photo frame), various medical devices (for example, Magnetic Resonance Angiography (MRA), Magnetic Resonance Imaging (MRI), Computed Tomography (CT), tomography, and ultrasonograph), a navigation device, a Global Positioning System (GPS) receiver, an Event Data Recorder (EDR), a Flight Data Recorder (FDR), a set-top box, a TV box (for example, Samsung HomeSync™, Apple TV™, or a Google TV™), an electronic dictionary, a vehicle infotainment device, electronic equipment for ship (for example, a navigation device for a ship or a gyro compass), avionics, a security device, an electronic garment, an electronic key, a camcorder, a game console, Head-Mounted Display (HMD), a flat panel display device, an electronic album, part of a furniture or building/structure including a communication function, an electronic board, an electronic signature receiving device, and a projector. It is apparent to those skilled in the art that the electronic device is not limited to the above-mentioned devices.

FIG. 1 is a block diagram illustrating an electronic device according to an embodiment of the present disclosure.

Referring to FIG. 1, the electronic device 100 includes a bus 110, a processor 120, a memory 130, a user input module 140, a display module 150, and a communication module 160.

The bus may be a circuit connecting the above-mentioned components to each other and delivering a communication (for example, a control message) therebetween.

The processor 120 receives a command from the above other components (for example, the memory 130, the user input module 140, the display module 150, and the communication module 160) through the bus 110, interprets the received command, and performs operations and data processing in response to the interpreted command.

The memory 130 may store commands or data received from or generated by the processor 120 or the above other components (for example, the user input module 140, the display module 150, and the communication module 160). The memory 130 may include programming modules, for example, a kernel 131, a middleware 132, an application programming interface 133, and an application 134. Each of the above-mentioned programming modules may be configured with software, firmware, hardware, or a combination thereof.

The kernel 131 may control or manage system resources (for example, the bus 110, the processor 120, or the memory 130) used for performing operation or functions implemented by the remaining other programming modules, for example, the middleware 132, the API 133, or the application 134. Additionally, the kernel 131 may provide an interface for accessing an individual component of the electronic device 100 from the kernel 131, the middleware 132, the API 133, or the application 134 and controlling or managing it.

The middleware 132 may serve as an intermediary role for exchanging data between the API 133 or the application 134 and the kernel 131 through communication. Additionally, in relation to job requests received from a plurality of applications 134, the middleware 132 may perform a load balancing on the job requests by using a method of assigning a priority for using a system resource (for example, the bus 110, the processor 120, or the memory 130) to at least one application among the plurality of applications 134.

The API 133, as an interface through which the application 134 controls a function provided from the kernel 131 or the middleware 132, may include at least one interface or function for file control, window control, image processing, or character control.

The user input module 140 may receive commands or data from a user and delivers them to the processor 120 or the memory 130 via the bus 110. The display module 150 may display images, video, or data to a user.

The communication module 160 may connect a communication between another electronic device 102 and the electronic device 100. The communication module 160 may support a determined short range communication protocol (for example, Wireless Fidelity (Wifi), Bluetooth (BT), Near Field Communication (NFC)) or a network communication 162 (for example, Internet, Local Area Network (LAN), Wire Area Network (WAN), telecommunication network, cellular network, satellite network or Plain Old Telephone Service (POTS)). The network communication 162 may include support a server 164. The other electronic device 104 may be identical to (for example, the same type) or different from (for example, a different type) the electronic device 100.

Figure 2:
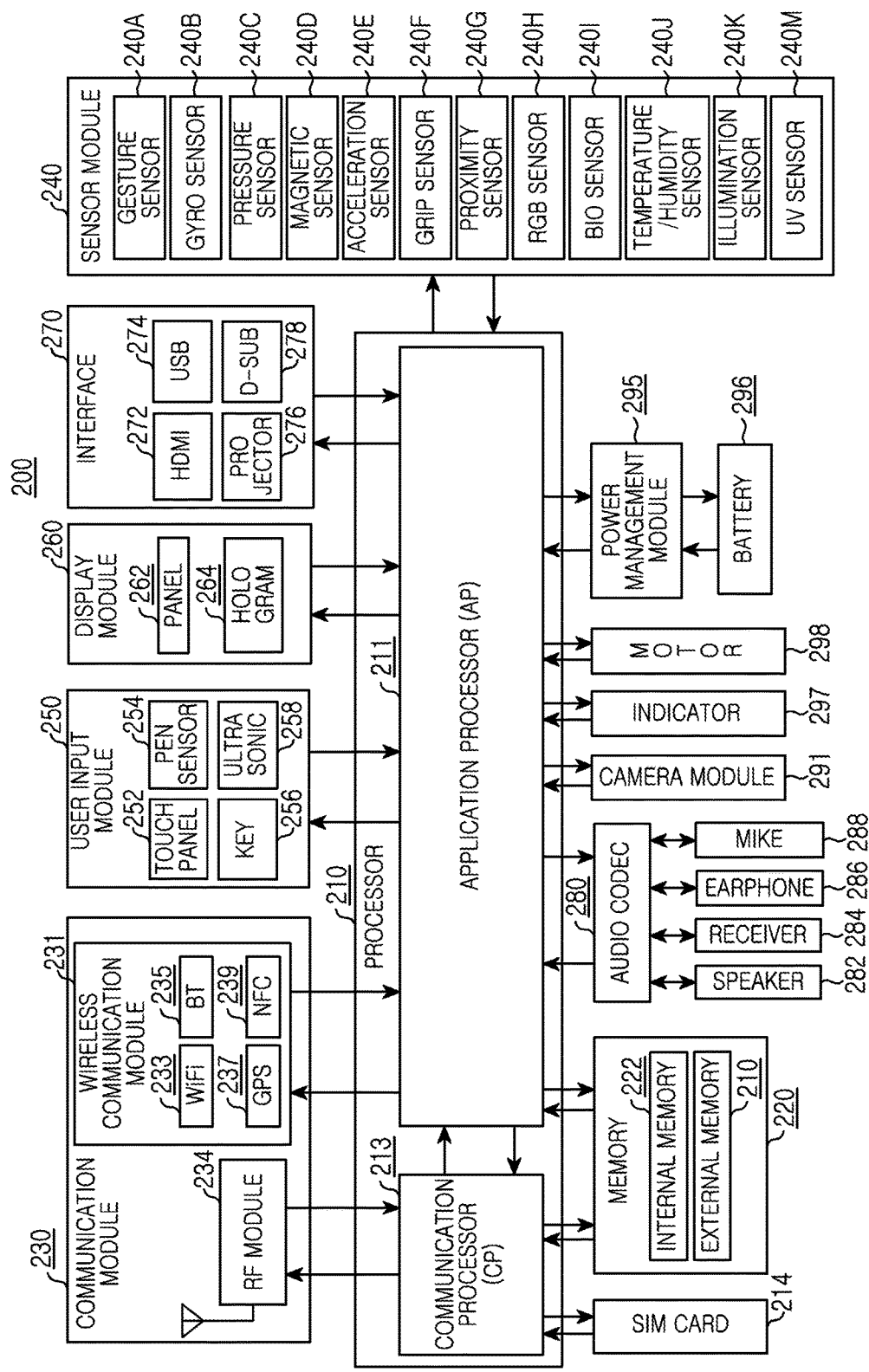
FIG. 2 is a block diagram illustrating hardware according to an embodiment of the present disclosure.

FIG. 2 is a block diagram illustrating hardware according to an embodiment of the present disclosure.

Referring to FIG. 2, the hardware 200 may be the electronic device 100 shown in FIG. 1, for example. In FIG. 2, the hardware 200 includes at least one processor 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (for example, the processor 120) may include at least one Application Processor (AP) 211 or at least one Communication Processor (CP) 213. The processor 210 may be the processor 120 shown in FIG. 1, for example. Although the AP 211 and the CP 213 included in the processor 210 are shown in FIG. 2, they may be included in different IC packages. According to an embodiment of the present disclosure, the AP 211 and the CP 213 may be included in one IC package. In this present disclosure, the processor 210 may be configured with a first processor and a second processor. The first processor determines whether there is a state change by using at least one equipped sensor, and if it is determined that there is a state change, determines whether to transmit the state information to the second processor. Additionally, the first processor determines whether there is at least one change among a position change, an altitude change, a temperature change, a pressure change, a humidity change, an illumination change, and a pressure change, which exceed a determined numerical value by using at least one sensor connected to the first processor. The first processor may detect that a state change switches from a state of more than a determined numerical value into a state of less than a determined numerical value by using at least one sensor connected to the first processor. In embodiments, the first processor may detect that a state change switches from a state of more than a determined numerical value into a state of less than a determined numerical value by using at least one sensor connected to the first processor and then may determine to transmit the state information to the second processor. Additionally, the first processor may operate with a power of less than a determined value.

The second processor may determine whether to measure a changed position at each set period by using a provided positioning module according to whether the state information is received. In an embodiment, if not receiving the state information, the second processor may not measure the position even when the next position measuring period, at which a position measuring module starts to measure the position, arrives. Additionally, upon receiving the state information, the second processor confirms the next position measuring period for starting to measure the position by using the position measuring module, confirms that the next position measuring period for starting to measure the position by using the position measuring module arrives, and measures a changed position at the next position measuring period by using the position measuring module. In an embodiment, the second processor may read the state information from the first processor and may confirm the read state information when the next position measuring period arrives. Moreover, the second processor may be in one of a wakeup state and a sleep state.

The AP 211 may control a plurality of hardware or software components connected to the AP 211 by executing an operating system or an application program and may perform various data processing and operations with multimedia data. The AP 211 may be implemented with a System on Chip (SoC), for example. According to an embodiment of the present disclosure, the processor 210 may further include a Graphic Processing Unit (GPU) (not shown).

The CP 213 may manage a data link in a communication between an electronic device (for example, the electronic device 100) including the hardware 200 and other electronic devices connected via a network and may convert a communication protocol. The CP 213 may be implemented with an SoC, for example. According to an embodiment of the present disclosure, the CP 213 may perform at least part of a multimedia control function. The CP 213 may perform a distinction and authentication of a terminal in a communication network by using a subscriber identification module (for example, the SIM card 214), for example. Additionally, the CP 213 may provide services, for example, a voice call, a video call, a text message, or packet data, to a user.

Additionally, the CP 213 may control data transmission of the communication module 230. As shown in FIG. 2, components such as the CP 213, the poser management module 295, or the memory 220 are separated from the AP 211, but according to an embodiment of the present disclosure, the AP 211 may be implemented including some of the above-mentioned components (for example, the CP 213).

According to an embodiment of the present disclosure, the AP 211 or the CP 213 may load commands or data, which are received from a nonvolatile memory or at least one of other components connected thereto, into a volatile memory and may process them. Furthermore, the AP 211 or the CP 213 may store data received from or generated by at least one of other components in a nonvolatile memory.

The SIM card 214 may be a card implementing a subscriber identification module and may be inserted into a slot formed at a specific position of an electronic device. The SIM card 214 may include unique identification information (for example, an Integrated Circuit Card Identifier (ICCID) or subscriber information (for example, an International Mobile Subscriber Identity (IMSI)).

The memory 220 may include an internal memory 222 or an external memory 224. The memory 220 may be the memory 130 shown in FIG. 1, for example. The internal memory 222 may include at least one of a volatile memory (for example, Dynamic RAM (DRAM), Static RAM (SRAM), Synchronous Dynamic RAM (SDRAM)) and a non-volatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory) According to an embodiment of the present disclosure, the internal memory 222 may have a form of Solid State Drive (SSD). The external memory 224 may further include Compact Flash (CF), Secure Digital (SD), Micro Secure Digital (Micro-SD), Mini Secure Digital (Mini-SD), extreme Digital (xD), or memory stick. According to an embodiment of the present disclosure, the memory 220 may store information on a state switching into a state of less than a determined numerical value.

The communication module 230 may include a wireless communication module 231 or an RF module 234. The communication module 230 may be the communication module 160 shown in FIG. 1, for example. The wireless communication module 231 may include WiFi 233, BT 235, a GPS 237, or NFC 239. For example, the wireless communication module 231 may provide a wireless communication function by using a wireless frequency. Additionally or alternatively, the wireless communication module 231 may include a network interface (for example, a LAN card) or a modem for connecting the hardware 200 to a network (for example, Internet, LAN, WAN, telecommunication network, cellular network, satellite network, or POTS).

The RF module 234 may be responsible for data transmission, for example, the transmission of an RF signal or a called electrical signal. Although not shown in the drawings, the RF module 234 may include a transceiver, a Power Amp Module (PAM), a frequency filter, or a Low Noise Amplifier (LNA). Or, the RF module 234 may further include components for transmitting/receiving electromagnetic waves on free space in a wireless communication, for example, conductors or conducting wires.

The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a Red, Green, Blue (RGB) sensor 240H, a bio sensor 240I, a temperature/humidity sensor 240J, an illumination sensor 240K, and a Ultra Violet (UV) sensor 240M. The sensor module 240 measures physical quantities or detects an operating state of an electronic device, thereby converting the measured or detected information into electrical signals. Additionally/alternately, the sensor module 240 may include an E-nose sensor (not shown), an Electromyography (EMG) sensor, an Electroencephalogram (EEG) sensor (not shown), or an Electrocardiogram (ECG) sensor (not shown). The sensor module 240 may further include a control circuit for controlling at least one sensor therein.

The user input module 250 may include a touch panel 252, a (digital) pen sensor 254, a key 256, or an ultrasonic input device 258. The user input module 250 may be the user input module 140 shown in FIG. 1, for example. The touch panel 252 may recognize a touch input through at least one of a capacitive, resistive, infrared, or ultrasonic method, for example. Additionally, the touch panel 252 may further include a controller (not shown). In the case of the capacitive method, both direct touch and proximity recognition are possible. The touch panel 252 may further include a tactile layer. In this case, the touch panel 252 may provide a tactile response to a user.

The (digital) pen sensor 254 may be implemented through a method similar or identical to that of receiving a user's touch input or an additional sheet for recognition. As the key 256, a keypad or a touch key may be used, for example. The ultrasonic input device 258, as a device confirming data by detecting sound waves through a mike (for example, the mike 288) in a terminal, may provide wireless recognition through a pen generating ultrasonic signals. According to an embodiment of the present disclosure, the hardware 200 may receive a user input from an external device (for example, a network, a computer, or a server) connected to the hardware 200 through the communication module 230.

The display module 260 may include a panel 262 or a hologram 264. The display module 260 may be the display module 150 shown in FIG. 1, for example. The panel 262 may include a Liquid-Crystal Display (LCD) or an Active-Matrix Organic Light-Emitting Diode (AM-OLED). The panel 262 may be implemented to be flexible, transparent, or wearable, for example. The panel 262 and the touch panel 252 may be configured with one module. The hologram 264 may show three-dimensional images in the air by using the interference of light. According to an embodiment of the present disclosure, the display module 260 may further include a control circuit to control the panel 262 or the hologram 264.

The interface 270 may include a High-Definition Multimedia Interface (HDMI) 272, a Universal Serial Bus (USB) 274, a projector 276, or a D-subminiature (sub) 278. Additionally/alternately, the interface 270 may include an SD/Multi-Media Card (MMC) (not shown) or an Infrared Data Association (IrDA) (not shown).

The audio codec 280 may convert voice into electrical signal and vice versa. The audio codec 280 may convert voice information inputted through or outputted from a speaker 282, a receiver 284, an earphone 286, or a mike 288.

According to an embodiment of the present disclosure, the camera module 291, as a device for capturing an image and video, may include at least one image sensor (for example, a front lens or a rear lens), an image Signal Processor (SP) (not shown), or a flash LED (not shown).

The power management module 295 may manage the power of the hardware 200. Although not shown in the drawings, the power management module 295 may include a Power Management Integrated Circuit (PMIC), a charger Integrated Circuit (IC), or a battery fuel gauge.

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present disclosure, the charger IC may include a charger IC component for at least one of the wired charging method and the wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

A battery gauge may measure the remaining amount of the battery 296, or a voltage, current, or temperature thereof during charging. The battery 296 may generate electricity and supply power. For example, the battery 296 may be a rechargeable battery.

The indicator 297 may display a specific state of the hardware 200 or a part thereof (for example, the AP 211), for example, a booting state, a message state, or a charging state. The motor 298 may convert electrical signals into mechanical vibration. The MCU 299 may control the sensor module 240.

Although not shown in the drawings, the hardware 200 may include a processing device (for example, a GPU) for mobile TV support. The processing device for mobile TV support may process media data according to the standards such as Digital Multimedia Broadcasting (DMB), Digital Video Broadcasting (DVB) or media flow.

The names of the above-mentioned components in hardware according to an embodiment of the present disclosure may vary according to types of an electronic device. Hardware according to an embodiment of the present disclosure may be configured including at least one of the above-mentioned components or additional other components. Additionally, some components in hardware according to an embodiment of the present disclosure are configured as one entity, so that functions of previous corresponding components are performed identically.

Figure 3:
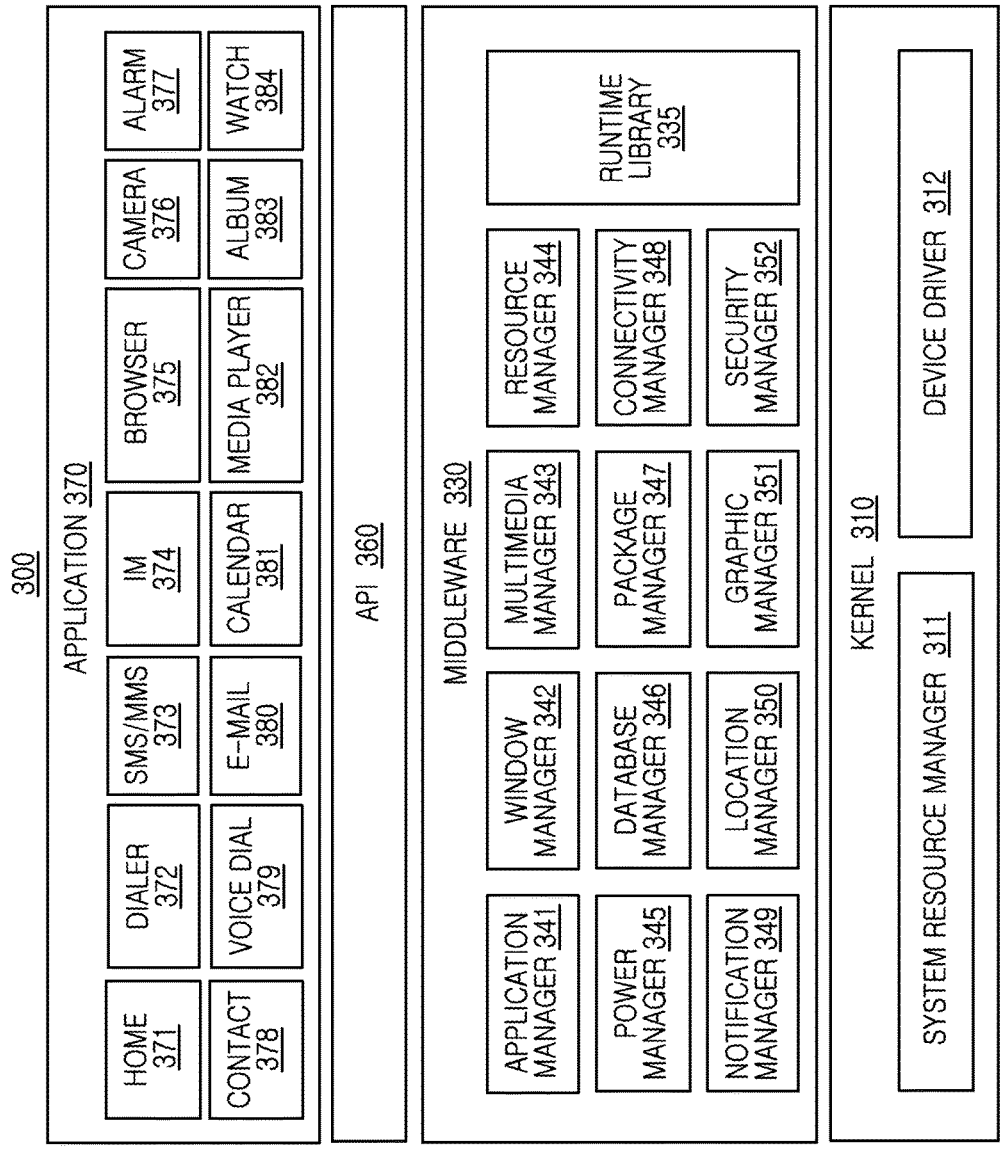
FIG. 3 is a block diagram illustrating a programming module according to an embodiment of the present disclosure.

FIG. 3 is a block diagram illustrating a programming module according to an embodiment of the present disclosure.

Referring to FIG. 3, the programming module 300 may be included (for example, stored) in the electronic device 100 (for example, the memory 130) of FIG. 1. At least part of the programming module 300 may be configured with software, firmware, hardware, or a combination thereof. The programming module 300 may include an Operating System (OS) controlling a resource relating to an electronic device (for example, the electronic device 100) implemented in hardware (for example, the hardware 200) or various applications (for example, the application 370) running on the OS. For example, the OS may include Android, iOS, Windows, Symbian, Tizen, or Bada. Referring to FIG. 3, the programming module 300 may include a kernel 310, a middleware 330, an Application Programming Interface (API) 360, or an application 370.

The kernel 310 (for example, the kernel 131) may include a system resource manager 311 or a device driver 312. The system resource manager 311 may include a process management unit 313, a memory management unit 315, or a file system management unit 317, for example. The system resource manager 311 may perform control, allocation, or recovery of a system resource. The device driver 312 may include a display driver 314, a camera driver 316, a Bluetooth driver 318, a sharing memory driver 320, a USB driver 322, a keypad driver 324, a keypad driver 324, a WiFi driver 326, or an audio driver 328. Additionally, according to an embodiment of the present disclosure, the device driver 312 may include an Inter-Processing Communication (IPC) driver (not shown).

The middleware 330 may include a plurality of pre-implemented modules for providing functions that the application 370 commonly requires. Additionally, the middleware 330 may provide functions through the API 360 to allow the application 370 to efficiently use a limited system resource in an electronic device. For example, as shown in FIG. 3, the middleware 330 (for example, the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module in which a compiler is used to add a new function through programming language while the application 370 is executed. According to an embodiment of the present disclosure, the runtime library 335 may perform functions relating to an input/output, memory management, or calculation operation.

The application manager 341 may manage a life cycle of at least one application among the applications 370. The window manager 342 may manage a GUI resource using a screen. The multimedia manager 343 may recognize a format necessary for playing various media files and may perform encoding or decoding on a media file by using a codec appropriate for a corresponding format. The resource manager 344 may manage a resource such as source code, memory, or storage space of at least one application among the applications 370.

The power manager 345 manages a battery or power in operation with Basic Input/Output System (BIOS) and provides power information necessary for an operation. The database manager 346 may perform a management operation to generate, search or change a database used for at least one application among the applications 370. The package manager 347 may manage the installation or update of an application distributed in a package file format.

The connectivity manager 348 may manage a wireless connection such as WiFi or Bluetooth. The notification manager 349 may display or notify events such as arrival messages, appointments, and proximity alerts in a manner that is not disruptive to a user. The location manager 350 may manage location information of an electronic device. The graphic manager 351 may manage a graphic effect to be provided to a user or a user interface relating thereto. The security manager 352 may provide a general security function necessary for system security or user authentication. According to an embodiment of the present disclosure, when an electronic device (for example, the electronic device 100) has a call function, the middleware 330 may further include a telephony manager (not shown) for managing a voice or video call function of the electronic device.

The middleware 330 may generate and use a new middleware module through various function combinations of the above-mentioned internal component modules. The middleware 330 may provide modules specified according to types of OS so as to provide distinctive functions. Additionally, the middleware 330 may delete some of existing components or add new components dynamically. Accordingly, some of components listed in an embodiment of the present disclosure may be omitted, other components are added, or components having different names and performing similar functions may be substituted.

The API 360 (for example, the API 133) may be provided as a set of API programming functions with a different configuration according OS. For example, in the case of Android or iOS, for example, one API set may be provided by each platform, and in the case of Tizen, for example, more than two API sets may be provided.

The application 370 (for example, the application 134) may include a preloaded application or a third party application. For example, application 370 may include any of a home application 371, a dialer application 372, an Short Message Service/Multimedia Message Service application (SMS/MMS) 373, an Instant Message (IM) application 374, a browser application 375, a camera application 376, an alarm application 377, a contact application 378, a voice dial application 379, an e-mail application 380, a calendar application 381, a media player application 382, an album application 383, a watch application 384, and the like.

At least part of the programming module 300 may be implemented using a command stored in computer-readable storage media. When the command is executed by at least one processor (for example, the processor 210), the at least one processor may perform a function corresponding to the command. The computer-readable storage media may include the memory 260. At least part of the programming module 300 may be implemented (for example, executed) by the processor 210. At least part of the programming module 300 may include a module, a program, a routine, sets of instructions, or a process to perform at least one function.

The names of components of a programming module (for example, the programming module 300) according to an embodiment of the present disclosure may vary according to types of OS. Additionally, a programming module according to an embodiment of the present disclosure may be configured including at least one of the above-mentioned components or additional other components.

Figure 4:
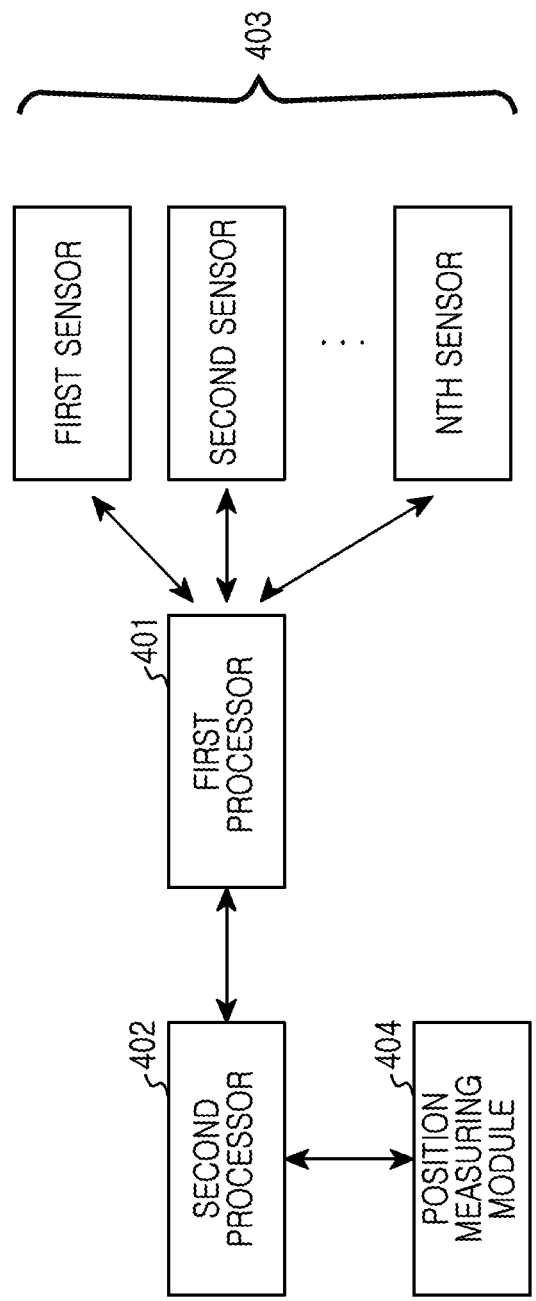
FIG. 4 is a block diagram illustrating a configuration of an electronic device according to an embodiment of the present disclosure.

FIG. 4 is a block diagram illustrating a configuration of an electronic device according to an embodiment of the present disclosure.

Referring to FIG. 4, the electronic device may include a first processor 401, a second processor 402, a plurality of sensors 403, and a position measuring module 404.

In FIG. 4, the plurality of sensors 403 may detect a state change of the electronic device. More specifically, the plurality of sensors 403 may detect a change in state of the electronic device. Here, the plurality of sensors 403 may include motion sensors such as an acceleration sensor, a gyroscope sensor, and a magnetic sensor. Additionally, the plurality of sensors 403 may be gesture sensors including a proximity sensor and an infrared ray sensor. Additionally, the plurality of sensors 403 may be light sensors including an ambient light sensor, an ultra violet sensor, and an illumination sensor.

Additionally, the plurality of sensors 403 may be environment sensors including a temperature humidity sensor, a volatile organic compounds sensor, and a carbon dioxide sensor. Additionally, the plurality of sensors 403 may be atmospheric pressure sensors including a barometer and an altimeter. Additionally, the plurality of sensors 403 may be touch pressure sensors including a strain gauge sensor, a pressure sensor, and a fingerprint sensor.

The first processor 401 may determine whether there is a state change in an electronic device by using the plurality of sensors 403 connected to the first processor 401. More specifically, the first processor determines whether there is at least one change among a position change, an altitude change, a temperature change, a pressure change, a humidity change, an illumination change, and a pressure change, which exceed a determined numerical value, by using the plurality of sensors 403 connected to the first processor 401.

Additionally, if it is determined that there is a state change in the electronic device, the first processor 401 may determine whether to transmit state information to the second processor 402. More specifically, even when it is determined that there is a state change in the electronic device, the first processor 401 may determine whether to store the state information or whether to transmit the state information to the second processor 402.

That is, when the first processor 401 detects that a state change switches from a state of more than a determined numerical value into a state of less than a determined numerical value by using the plurality of sensors 403 connected to the first processor 401, it may store state information on switching into a state of less than a numerical value set by the first processor 401. However, when the first processor 401 detects that a state change switches from a state of less than a determined numerical value into a state of more than a determined numerical value by using the plurality of sensors 403 connected to the first processor 401, it may determine to transmit state information to the second processor 402.

The reason is that when a changed state of the electronic device switches into a state of less than a set numerical value, since the first processor 401 substantially determines that there is no a position change, it is unnecessary to measure a position change of the electronic device by using the second processor 402. However, when a changed state of the electronic device switches into a state of more than a set numerical value, the first processor may determine to transmit state information to the second processor 402 so as to allow the second processor 402 to measure a changed position of the electronic device.

The second processor 402 may determine whether to measure a changed position at each set period by using the position measuring module 404 connected to the second processor 402 on the basis of whether the state information is received from the first processor 401.

If the state information is not received from the first processor 401, the second processor 402 may not measure a position even when the next position measuring period at which the position measuring module 404 connected to the second processor 402 starts to measure a position arrives. The reason is that when the state information is not received from the first processor 401, since there is no position change of the electronic device while the second processor 402 is in a sleep state, it is unnecessary to consume the current of the electronic device by waking up the second processor 402 in the sleep state. If the state information is not received from the first processor 401, it is unnecessary for the second processor 402 to measure a position by using the position measuring module 404 connected to the second processor 402 when the second processor 402 is in a wake-up state, that is, it is unnecessary to waste power.

If the state information is received from the first processor 401, the second processor 402 may confirm the next position measuring period for starting to measure a position by using the position measuring module 404. Then, the second processor 402 may measure a changed position by using the position measuring module 404 at the next position measuring period.

Moreover, the second processor 402 may read the state information from the first processor 401 and may confirm the read state information when the next position measuring period arrives. The reason is that an operation for reading updated state information from the first processor 401 consumes less power than an operation for directly receiving state information from the first processor 401, by the second processor 402, when the next position measuring period arrives.

Additionally, if the second processor 402 determines to measure a changed position, it may measure the changed position by using the position measuring module 404 at the next position measuring period among set periods.

The position measuring module 404 may measure a position of the electronic device under control of the second processor 402. Herein, the position measuring module 404 may use a measurement method of Global Navigation Satellite System (GNSS) including Global Positioning System (GPS), Global Navigation Satellite System (GLONASS), Beidou, Galileo, and Quasi-Zenith Satellite System (QZSS). Additionally, the position measuring module 404 may use a measurement method such as WIFI Positioning System (WPS), Cell Positioning, and Observed Time Difference Of Arrival (OTDOA). Additionally, the position measuring module 404 may use a measurement method of Fingerprinting Solution based on a Radio Map or an Access Point (AP) list. Additionally, the position measuring module 404 may use a measurement method of a tagging based Proximity Solution using NFC, Radio Frequency Identification (RFID), or Bluetooth Low Energy (BLE).

As mentioned above, if a set of conditions is satisfied after a state change of the electronic device is determined, the first processor 401 of the electronic device may measure a changed position of the electronic device. Therefore, the current consumption of the electronic device may be reduced.

Figure 5:
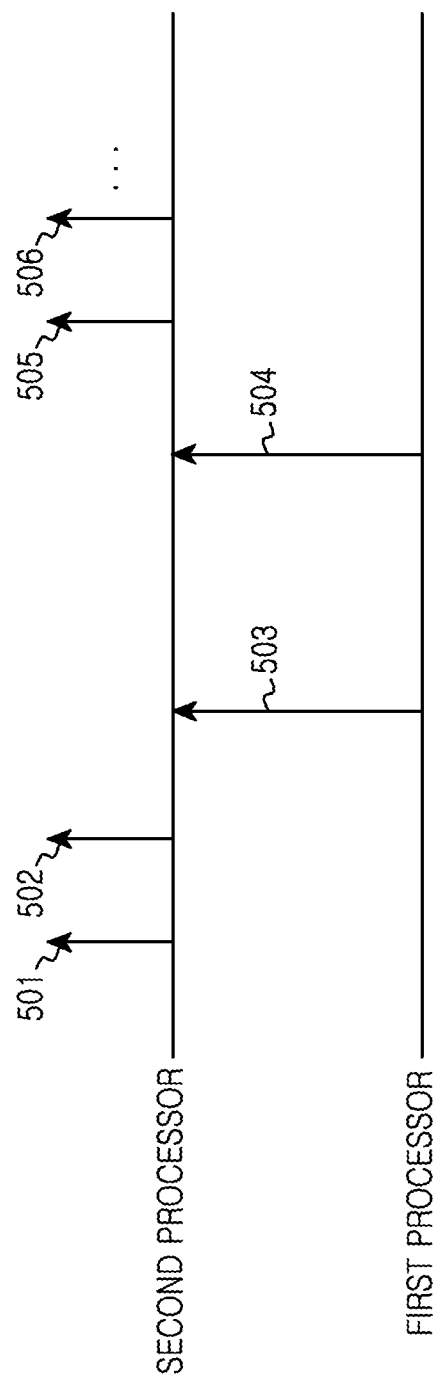
FIG. 5 is a view illustrating a view of measuring a position of an electronic device when a second processor receives state information from a first processor according to a first embodiment of the present disclosure.

FIG. 5 is a view illustrating a view of measuring a position of an electronic device when a second processor receives state information from a first processor according to a first embodiment of the present disclosure.

Referring to FIG. 5, the first processor in the electronic device is a processor operating with a low power of less than a set power and the second processor is a processor controlling overall operations of the electronic device. That is, in measuring a changed position of the electronic device, the biggest issue is to minimize an operating state of the second processor that relatively consumes greater than the first processor. Hereinafter, an embodiment in which the second processor receives state information from the first processor and then measures a position of the electronic device will be described in more detail.

In FIG. 5, the electronic device may be configured with two processors, that is, the first processor and the second processor. The first processor may measure a position change of the electronic device by using a position measuring module according to a set period. While the second processor is in a wake-up state or a sleep state, it may measure a position change of the electronic device at each set period so as to measure a changed position of the electronic device at the timing 501, 502, 505, or 506. For example, while the second processor is in a sleep state, if a period for measuring a position of the electronic device arrives, the second processor changes a mode of the electronic device, that is, from a sleep state into a wake-up state. While the second processor is in a wake-up state, if a period for measuring a position of the electronic device arrives, the second processor measures a position change of the electronic device at the timing 501 or 502. That is, according to an embodiment of the present disclosure, regardless of whether an operating state of the second processor is in a sleep state or a wake-up state, the second processor minimizes operations of a position measuring module. Therefore, current consumption may be reduced.

If the second processor receives data on a first specific condition from the first processor, even when a period for measuring a position of the electronic device arrives, the second processor may not measure a position by using a position measuring module. That is, if the second processor receives data on a first specific condition from the first processor, even when a period for measuring a position of the electronic device arrives, the second processor may not measure a position change.

In an embodiment, if the first processor determines that there is no movement of the electronic device, the first processor may transmit the data 503 including information that there is no movement of the electronic device to the second processor. Then, even when a period for measuring a position of the electronic device arrives, the second processor may not measure a position change of the electronic device. The reason is that since there is no movement of the electronic device, the electronic device prevents unnecessary operations for measuring a position change thereof so as to reduce current consumption.

If the second processor receives data on a second specific condition from the first processor, even when a period for measuring a position of the electronic device arrives, the second processor may measure a changed position of the electronic device again by using a position measuring module. For example, if the first processor determines that the electronic device switches from a stop state to a movement state, the first processor may transmit the data 504 including information that a current state of the second processor is a movement state to the second processor. Then, when a period for measuring a position of the electronic device arrives, the second processor may measure a position change of the electronic device at the timing 505 or 506.

Accordingly, when the first processor primarily determines a state change of the electronic device with low power and the state change of the electronic device is not detected, the second processor does not measure a position change by using a position measuring module connected to the second processor. Therefore, unnecessary current consumption may be reduced.

Figure 6:
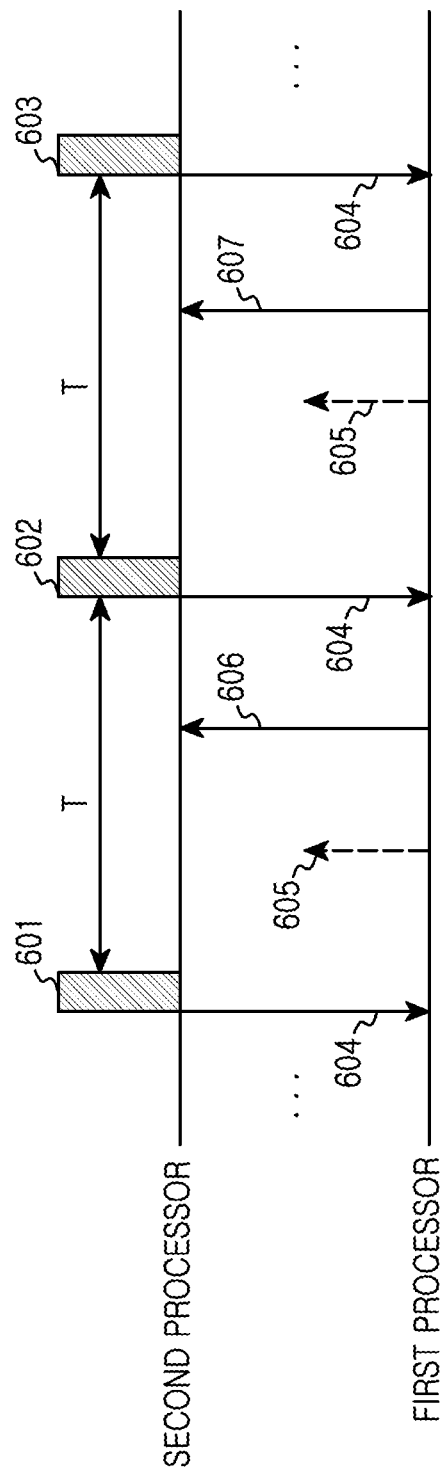
FIG. 6 is a view illustrating a view of measuring a position of an electronic device when a second processor receives state information from a first processor according to a second embodiment of the present disclosure.

FIG. 6 is a view illustrating a view of measuring a position of an electronic device when a second processor receives state information from a first processor according to a second embodiment of the present disclosure.

Referring to FIG. 6, the second processor may measure a position change of the electronic device at each set period T. In more detail, the second processor may measure a position change of the electronic device with the set period T at the timing 601, 602, or 603. Hereinafter, an embodiment in which the second processor receives state information from the first processor and then measures a position of the electronic device will be described in more detail.

In FIG. 6, the second processor reads the state information from the first processor at the timing 604 and confirms the read state information at the timing 604 when the next position measuring period arrives. The reason is that an operation for reading updated state information from the first processor consumes less power than an operation for directly receiving state information from the first processor, by the second processor, when the next position measuring period arrives.

When a period for measuring a position of the electronic device arrives, the second processor may measure a position change of the electronic device at the timing 601, 602, or 603. More particularly, while the second processor is in a sleep state, after it switches from the sleep state into a wake-up state, the second processor may measure a position change of the electronic device by using a position measuring module at the timing of 601, 602, or 603. If the second processor is in a wake-up state, it may measure a position change of the electronic device by immediately using a position measuring module at the timing 601, 602, or 603.

If it is determined that there is a state change in the electronic device, the first processor may determine whether to transmit state information to the second processor. More particularly, even when it is determined that there is a state change in the electronic device, the first processor may determine whether to store the state information or whether to transmit the state information to the second processor.

That is, when the first processor detects that a state change switches from a state of more than a determined numerical value into a state of less than a determined numerical value by using a plurality of sensors connected to the first processor, it may store the information 605 on a state switching into a state of less than a determined numerical value set by the first processor. The reason is that when a changed state of the electronic device switches into a state of less than a set numerical value, since the first processor substantially determines that there is no a position change, it is unnecessary to measure a position change of the electronic device by using the second processor.

However, when the first processor detects that a state change switches from a state of less than a determined numerical value into a state of more than a determined numerical value, it may transmit the state information 606 and 607 that a state of less than a determined numerical value switches into a state of more than a determined numerical value to the second processor. The reason is that when a changed state of the electronic device switches into a state of more than a determined numerical value, the first processor allows the second processor to measure a changed position of the electronic device.

Figure 7:
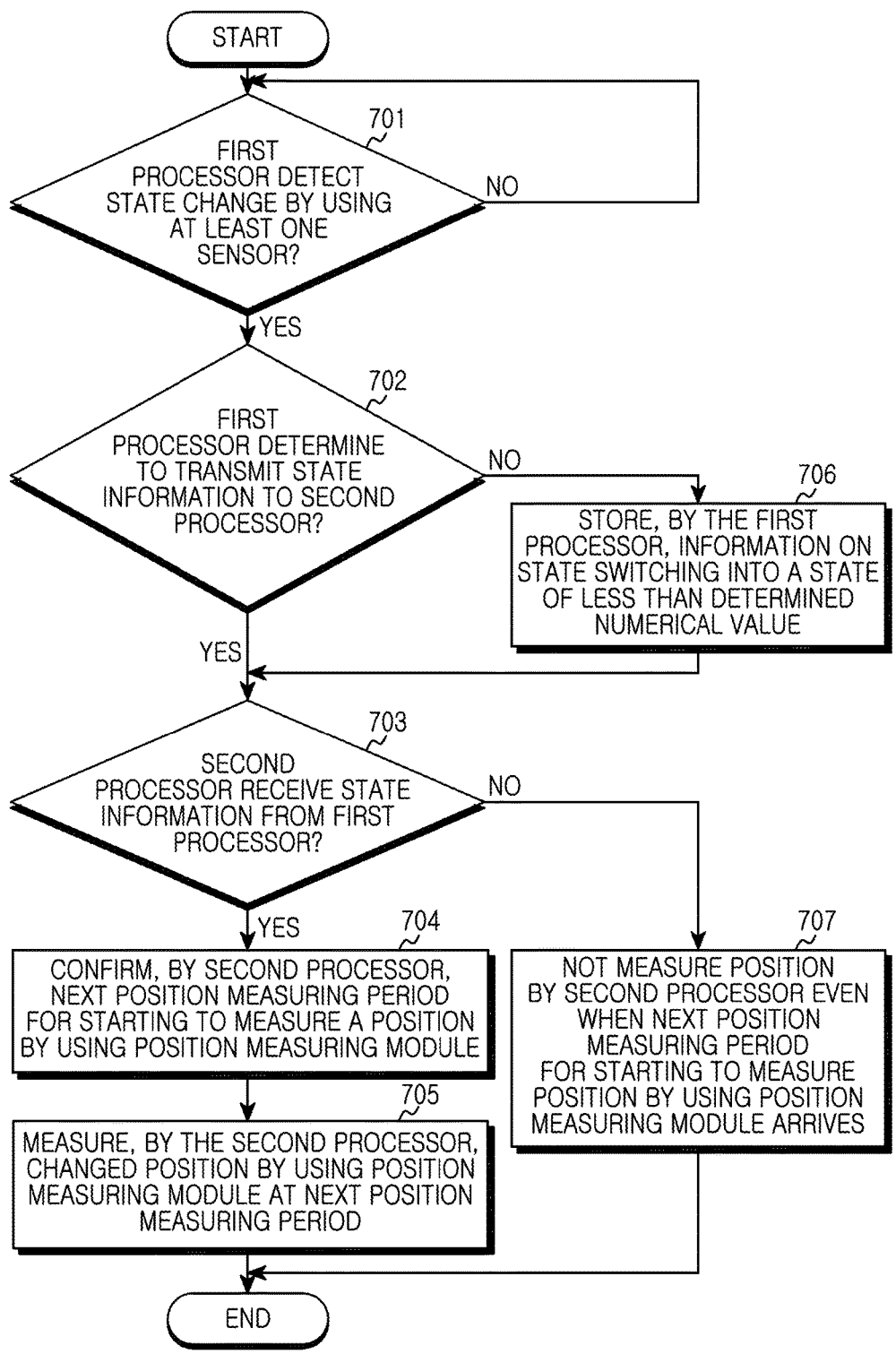
FIG. 7 is a flowchart illustrating an operation order of an electronic device measuring a position change with low power according to an embodiment of the present disclosure.

FIG. 7 is a flowchart illustrating an operation order of an electronic device measuring a position change with low power according to a second embodiment of the present disclosure.

Referring to FIG. 7, the electronic device determines whether a state change is detected using at least one sensor in the first processor in operation 701. More particularly, the first processor determines whether there is at least one change among a position change, an altitude change, a temperature change, a pressure change, a humidity change, an illumination change, and a pressure change, which exceed a determined numerical value, by using a plurality of sensors connected to the first processor.

If it is determined in operation 701 that the electronic device detects a state change by using at least one sensor in the first processor, the electronic device determines whether to transmit the state information from the first processor to the second processor in operation 702. In an embodiment, even when it is determined that there is a state change in the electronic device, the first processor may determine whether to store the state information or whether to transmit the state information to the second processor. That is, when the first processor detects that a state change switches from a state of more than a determined numerical value into a state of less than a determined numerical value by using a plurality of sensors connected to the first processor, it may store the information on a state switching into a state of less than a determined numerical value set by the first processor. However, when the first processor detects that a state change switches from a state of less than a determined numerical value into a state of more than a determined numerical value by using a plurality of sensors connected to the first processor, it may determine to transmit the state information to the second processor.

If the electronic device determines to transmit the state information from the first processor to the second processor in operation 702, it determines whether the second processor receives the state information from the first processor in operation 703. Here, the state information is information that there is at least one change among a position change, an altitude change, a temperature change, a pressure change, a humidity change, an illumination change, and a pressure change, which exceed a determined numerical value.

If the electronic device determines in operation 703 that the second processor receives state information from the first processor, it confirms the next position measuring period at which the second processor measures a position by using a position measuring module in operation 704. That is, if the electronic device determines that the second processor receives state information from the first processor, it confirms the closest position measuring period for measuring a position change of the electronic device.

The electronic device may measure a changed position by using the position measuring module in the second processor at the next position measuring period in operation 705. That is, since unnecessary current is consumed as the second processor starts to measure a position by using a position measuring module, it is more economical to allow a position measuring module to measure a position at the next period that the second processor starts to measure a position.

If the electronic device determines not to transmit the state information from the first processor to the second processor in operation 702, it may store the information on a state switching into a state of less than a determined numerical number set by the first processor in operation 706. The reason is that when a changed state of the electronic device switches into a state of less than a set numerical value, since the first processor substantially determines that there is no a position change, it is unnecessary to measure a position change of the electronic device by using the second processor.

If the electronic device determines that the second processor does not receive state information from the first processor in operation 703, even when the next position measuring period for starting to measure a position by using a position measuring module arrives, the second processor may not measure a position of the electronic device in operation 707. The reason is that when a changed state of the electronic device switches into a state of less than a set numerical value, since the first processor substantially determines that there is no position change, it is unnecessary to measure a position change of the electronic device by using the second processor.

Figure 8:
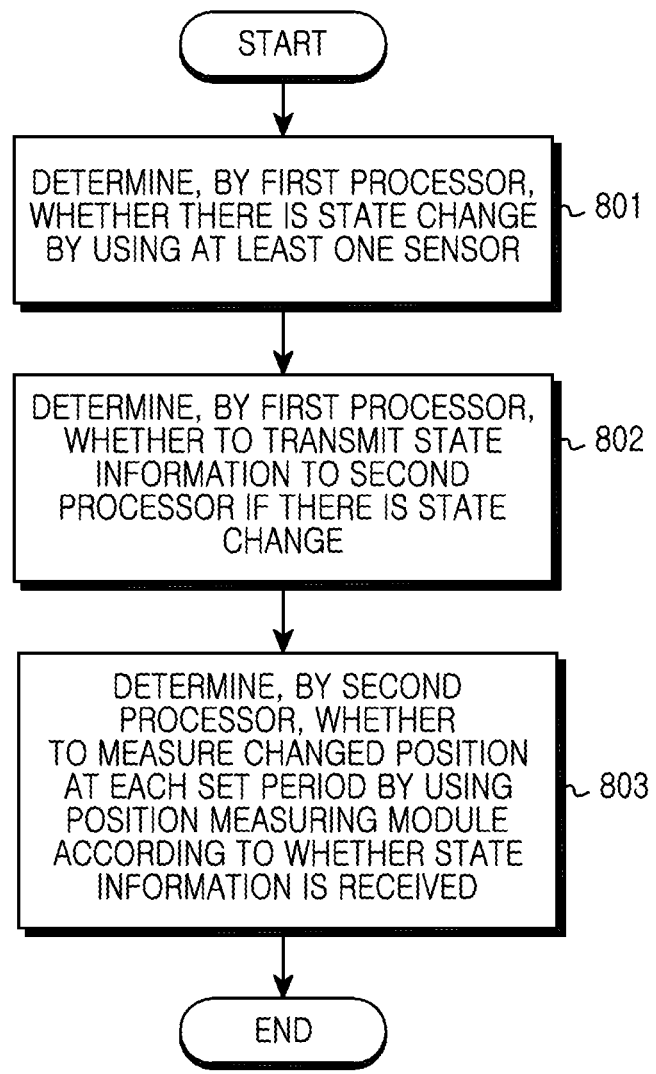
FIG. 8 is a flowchart illustrating a method of an electronic device according to an embodiment of the present disclosure.

FIG. 8 is a flowchart illustrating a method of an electronic device according to an embodiment of the present disclosure.

Referring to FIG. 8, the electronic device determines whether a state change is detected using at least one sensor in the first processor in operation 801. More specifically, the first processor determines whether there is at least one change among a position change, an altitude change, a temperature change, a pressure change, a humidity change, an illumination change, and a pressure change, which exceed a determined numerical value, by using a plurality of sensors connected to the first processor.

If the electronic device determines that there is a state change, it may determine whether to transmit state information from the first processor to the second processor in operation 802. In an embodiment, even when it is determined that there is a state change in the electronic device, the first processor may determine whether to store the state information or whether to transmit the state information to the second processor. That is, when the first processor detects that a state change switches from a state of more than a determined numerical value into a state of less than a determined numerical value by using a plurality of sensors connected to the first processor, it may store the information on a state switching into a state of less than a determined numerical value. However, when the first processor detects that a state change switches from a state of less than a determined numerical value into a state of more than a determined numerical value by using a plurality of sensors connected to the first processor, it may determine to transmit the state information to the second processor.

According to whether state information is received, the electronic device determines whether to measure a changed position at each set period by using a position measuring module in the second processor in operation 803. That is, when the first processor detects that a state change switches from a state of more than a determined numerical value into a state of less than a determined numerical value by using a plurality of sensors connected to the first processor, it may store the information in a state switching into a state of less than a determined numerical value. However, when the first processor detects that a state change switches from a state of less than a determined numerical value into a state of more than a determined numerical value, it may transmit the state information that a state of less than a determined numerical value switches into a state of more than a determined numerical value to the second processor.

It will be appreciated that various embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and various embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
   detecting, by a first processor, that a state of the electronic device is changed, using at least one sensor;
   determining, by the first processor, whether a degree by which the state of the electronic device is changed is greater than or equal to a predetermined threshold;
   in response to determining that the degree is greater than or equal to the predetermined threshold, transmitting, by the first processor, information associated with the state of the electronic device to a second processor; and
   controlling, by the second processor, a position measuring module to measure a position of the electronic device at a set time which is scheduled to measure the position of the electronic device, in response to receiving the information associated with the state of the electronic device from the first processor, wherein controlling the position measuring module further comprises controlling, by the second processor, when the second processor does not receive the information from the first processor or receives information that the degree is less than the predetermined threshold, the position measuring module such that the position measuring module does not measure the position of the electronic device at the set time.

2. The method of claim 1, wherein the detecting comprises detecting, by the first processor, at least one of a position change, an altitude change, a temperature change, a pressure change, a humidity change, an illumination change, or a pressure change.

3. The method of claim 1, further comprising:
in response to determining that the degree is less than the predetermined threshold, storing, by the first processor, the information associated with the state of the electronic device without transmitting the information associated with the state of the electronic device to the second processor.

4. The method of claim 1, wherein the controlling comprises controlling, by the second processor, the position measuring module to measure the position of the electronic device at a next position measuring period which is the set time, based on the information associated with the state of the electronic device.

5. The method of claim 4, wherein the controlling further comprises:
reading, by the second processor, the information associated with the state of the electronic device from the first processor when the next position measuring period arrives; and
identifying the read information.

6. An electronic device comprising:
at least one sensor configured to detect a state of the electronic device;
a position measuring module configured to measure a position of the electronic device;
a first processor; and
a second processor,
wherein the first processor is configured to:
detect that the state of the electronic device is changed, using the at least one sensor,
determine whether a degree by which the state of the electronic device is changed is greater than or equal to a predetermined threshold, and
in response to determining that the degree is greater than or equal to the predetermined threshold, transmit information associated with the state of the electronic device to the second processor,
wherein the second processor is configured to:
control the position measuring module to measure the position of the electronic device at a set time which is scheduled to measure the position of the electronic device, in response to receiving the information associated with the state of the electronic device from the first processor, and
wherein the second processor is further configured to control, when the second processor does not receive the information from the first processor or receives information that the degree is less than the predetermined threshold, the position measuring module such that the position measuring module does not measure the position of the electronic device at the set time.

7. The device of claim 6, wherein the first processor is further configured to detect at least one of a position change, an altitude change, a temperature change, a pressure change, a humidity change, an illumination change, or a pressure change.

8. The device of claim 6, further comprising:
a memory,
wherein the first processor is further configured to store the information associated with the state of the electronic device in the memory without transmitting the information associated with the state of the electronic device to the second processor, in response to determining that the degree is less than the predetermined threshold.

9. The device of claim 6, wherein the second processor is configured to control the position measuring module to measure the position of the electronic device at a next position measuring period which is the set time, based on the information associated with the state of the electronic device.

10. The device of claim 9, wherein the second processor is further configured to read the information associated with the state of the electronic device from the first processor when the next position measuring period arrives and to identify the read information.

11. At least one non-transitory processor readable medium for storing a computer program of instructions configured to be readable by at least one processor for instructing the at least one processor to execute a computer process for performing a method comprising:
detecting, by a first processor, that a state of a electronic device is changed, using at least one sensor;
determining, by the first processor, whether a degree by which the state of the electronic device is changed is greater than or equal to a predetermined threshold;
in response to determining that the degree is greater than or equal to the predetermined threshold, transmitting, by the first processor, information associated with the state of the electronic device to a second processor; and
controlling, by the second processor, a position measuring module to measure a position of the electronic device at a set time which is scheduled to measure the position of the electronic device, in response to receiving the information associated with the state of the electronic device from the first processor,
wherein controlling the position measuring module further comprise controlling, by the second processor, when the second processor does not receive the information from the first processor or receives information that the degree is less than the predetermined threshold, the position measuring module such that the position measuring module does not measure the position of the electronic device at the set time.

12. The method of claim 1,
wherein the second processor is changed from a sleep state into the wake-up state when the second processor that has been in the sleep state receives the information associated with the state of the electronic device from the first processor, and
wherein the first processor operates at a first power consumption level and the second processor operates at a second power level greater than the first power consumption level in the wake-up state.

13. The device of claim 6,
wherein the second processor is changed from a sleep state into the wake-up state when the second processor that has been in the sleep state receives the information associated with the state of the electronic device from the first processor, and wherein the first processor operates at a first power consumption level and the second processor operates at a second power level greater than the first power consumption level in the wake-up state.

14. The at least one non-transitory processor readable medium of claim 11,
wherein the second processor is changed from a sleep state into the wake-up state when the second processor that has been in the sleep state receives the information associated with the state of the electronic device from the first processor, and
wherein the first processor operates at a first power consumption level and the second processor operates at a second power level greater than the first power consumption level in the wake-up state.

* * * * *